United States Patent
Gyllenhammar et al.

(10) Patent No.: US 12,182,010 B2
(45) Date of Patent: Dec. 31, 2024

(54) VEHICLE SOFTWARE SHADOW MODE TESTING

(71) Applicant: Zenseact AB, Gothenburg (SE)

(72) Inventors: Magnus Gyllenhammar, Pixbo (SE); Carl Zandén, Lindome (SE); Majid Khorsand Vakilzadeh, Mölndal (SE); Mina Alibeigi, Gothenburg (SE)

(73) Assignee: Zenseact AB, Gothenburg (SE)

( * ) Notice: Subject to any disclaimer, the term of this patent is extended or adjusted under 35 U.S.C. 154(b) by 303 days.

(21) Appl. No.: 17/705,623

(22) Filed: Mar. 28, 2022

(65) Prior Publication Data

US 2022/0342804 A1 Oct. 27, 2022

(30) Foreign Application Priority Data

Apr. 23, 2021 (EP) .................................. 21170064

(51) Int. Cl.
*G06F 11/36* (2006.01)
*B60W 60/00* (2020.01)
*G06F 11/34* (2006.01)

(52) U.S. Cl.
CPC ..... *G06F 11/3696* (2013.01); *B60W 60/0011* (2020.02); *G06F 11/3457* (2013.01); *G06F 11/3688* (2013.01); *B60W 2556/50* (2020.02); *B60W 2756/10* (2020.02)

(58) Field of Classification Search
CPC ............. G06F 11/3457; G06F 11/3688; G06F 11/3696; B60W 2556/50; B60W 2756/10
See application file for complete search history.

(56) References Cited

U.S. PATENT DOCUMENTS

| | | | |
|---|---|---|---|
| 2020/0189608 A1* | 6/2020 | Braley | B60W 50/029 |
| 2020/0293054 A1* | 9/2020 | George | G05D 1/0221 |
| 2021/0107499 A1 | 4/2021 | Brannstrom et al. | |

(Continued)

OTHER PUBLICATIONS

Yu et al., "The benefit of Simulation Test Application on the Development of Autonomous Driving System", published by IEEE, 2020 International Automatic Control Conference (CACS), pp. 1-5 (Year: 2020).*

(Continued)

*Primary Examiner* — S. Sough
*Assistant Examiner* — Zheng Wei
(74) *Attorney, Agent, or Firm* — Weisberg I.P. Law, P.A.

(57) ABSTRACT

A test-optimizing system for supporting shadow mode testing of ADS software included in an ADS-provided vehicle. One or more potential vehicle routes are retrieved. A geographical area covering the one or more potential vehicle routes is obtained and data of crucial locations associated with past vehicle situations identified as critical and/or challenging. Moreover, the test-optimizing system retrieves respective ODD for one or more candidate software respectively adapted to run in the background of the vehicle. ODD-compliant locations for respective candidate software are determined, by identifying locations out of the data of crucial locations lying within respective candidate software's ODD. At least a first test-compliant location along at least a first route out of the one or more potential vehicle routes is determined by identifying for at least a first candidate software, locations out of the ODD-compliant locations situated along the at least first route.

16 Claims, 3 Drawing Sheets

(56) References Cited

U.S. PATENT DOCUMENTS

| | | | |
|---|---|---|---|
| 2021/0302981 A1* | 9/2021 | Case | G05D 1/0221 |
| 2022/0185302 A1* | 6/2022 | Dev | G07C 5/085 |
| 2022/0187082 A1* | 6/2022 | Matta | G01C 21/3667 |
| 2022/0383421 A1* | 12/2022 | Grivel | G06Q 40/08 |
| 2024/0034362 A1* | 2/2024 | Oba | B60W 60/0051 |

OTHER PUBLICATIONS

Colwell et al., "An Automated Vehicle Safety Concept Based on Runtime Restriction of the Operational Design Domain", published by IEEE, 2018 IEEE Intelligent Vehicles Symposium (IV) Changshu, Suzhou, China, Jun. 26-30, pp. 1910-1917 (Year: 2018).*

Gangopadhyay et al., "Identification of Test Cases for Automated Driving Systems Using Bayesian Optimization", published by The University of Warwick, 2019 IEEE Intelligent Transportation Systems Conference (ITSC), pp. 1-8 (Year: 2019).*

Liu et al., "An Analysis of Testing Scenarios for Automated Driving Systems", published IEEE, 2021 IEEE International Conference on Software Analysis, Evolution and Reengineering (SANER), pp. 622-629 (Year: 2021).*

EPO Communication and European Search Report dated Oct. 28, 2021 for European Patent Application No. 21170064.6 filed Apr. 23, 2021, consisting of 10-pages.

Siddartha Khastgir et al.; Systems Approach to Creating Test Scenarios for Automated Driving Systems; Reliability Engineering & System Safety, vol. 215; Nov. 2021, consisting of 14-pages.

\* cited by examiner

Fig. 1      1 Test-optimizing system

VEHICLE SOFTWARE SHADOW MODE TESTING

CROSS REFERENCE TO RELATED APPLICATION

This Application is related to and claims priority to European Patent Application No. 21170064.6, filed Apr. 23, 2021, entitled VEHICLE SOFTWARE SHADOW MODE TESTING, the entirety of which is incorporated herein by reference.

TECHNICAL FIELD

The present disclosure relates to supporting shadow mode testing of automated driving system, ADS, software comprised in an ADS-provided vehicle.

BACKGROUND

Within the automotive field, there has for quite some years been activity in development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

Assuring the safety of an ADS is one of the central challenges in being able to release such a system to the market. It is of great importance that an ADS neither exposes its vehicle occupant(s) nor surrounding traffic participants to unacceptable risks. Thus, before release to the market, the ADS software needs to be rigorously tested, which in turn may equate to a lengthy development loop. In order to shorten such a lengthy development loop of the ADS software, it is known to run a candidate ADS software in the background in a production vehicle—or in plural production vehicles such as in a large fleet thereof—and test the performance of the candidate software in an open-loop manner, so-called shadow mode testing. The idea of shadow mode testing enables an accelerated development loop of software for the ADS, in that the candidate software is run in the background in the production vehicle and consumes the data received from the vehicle platform. The performance of the candidate software may then be evaluated with respect to pre-specified metrics; for instance, its output can be evaluated using output from the active software in the vehicle, through self-assessment algorithms, and/or using a potential production ground truth. In case the outcome of a test is unfavorable for the candidate software, detail-rich data may be logged and transferred e.g. to back office for further analysis and/or potential improvement of the software. Favorable test outcomes, on the other hand, may be aggregated for instance as key performance indicators, KPIs, and/or statistics. Shadow mode testing is advantageous in that it alleviates the need to store and transfer huge amounts of raw data e.g. to back office in order to enable similar tests, e.g., Software-In-the-Loop testing, to further evaluate the performance of the candidate software.

However, running candidate software in a production vehicle may increase the need for available onboard computational power, particularly if there exists several candidate software to be evaluated. Although shadow mode testing may be feasible for testing of a single candidate software at a time, it may be greatly inefficient—or even infeasible—if several candidate software are to be continuously evaluated simultaneously. Triggering shadow mode testing of one or several candidate software based on real-time estimation of a criticality level, to avoid continuous evaluation, is not possible, since the candidate software requires an initialization time to process the information and adjust itself to the surrounding environment. Moreover, much of the driving experiences from production vehicles might not necessarily contain useful situations for the development of the new software. That is, commonly, production vehicles drive most of the time through normal operating conditions in which the traffic dynamics not necessarily expose the ADS—and subsequently the candidate software—to challenging and/or new situations crucial for development and testing of said candidate software. Performing shadow mode testing in such traffic dynamics may thus implicate that there is merely limited contribution to improving the design of the candidate software while computation bandwidth—which could otherwise be used for other purposes—nonetheless is occupied.

SUMMARY OF THE INVENTION

It is therefore an object of embodiments herein to provide an approach supporting shadow mode testing of ADS software comprised in an ADS-provided vehicle in an improved and/or alternative manner.

The object above may be achieved by the subject-matter disclosed herein. Embodiments are set forth in the appended claims, in the following description and in the drawings.

The disclosed subject-matter relates to a method performed by a test-optimizing system for supporting shadow mode testing of ADS software comprised in an ADS-provided vehicle. The test-optimizing system retrieves one or more potential vehicle routes. The test-optimizing system further obtains for a geographical area covering the one or more potential vehicle routes, data of crucial locations associated with past vehicle situations identified as critical and/or challenging. Moreover, the test-optimizing system retrieves respective operational design domain, ODD, for one or more candidate software respectively adapted to run in the background of the vehicle. The test-optimizing system further determines ODD-compliant locations for respective candidate software, by identifying locations out of the data of crucial locations lying within respective candidate software's ODD. Moreover, the test-optimizing system determines at least a first test-compliant location along at least a first route out of the one or more potential vehicle routes, by identifying for at least a first candidate software, locations out of the ODD-compliant locations situated along the at least first route.

The disclosed subject-matter further relates to a test-optimizing system for—and/or adapted for—supporting shadow mode testing of ADS software comprised in an ADS-provided vehicle. The test-optimizing system comprises a route retrieving unit for—and/or adapted for—retrieving one or more potential vehicle routes. Moreover, the test-optimizing system comprises a crucial locations obtaining unit for—and/or adapted for—obtaining, for a geographical area covering the one or more potential vehicle routes, data of crucial locations associated with past vehicle situations identified as critical and/or challenging. The test-optimizing system furthermore comprises an ODD retrieving unit for—and/or adapted for—retrieving respective ODD for one or more candidate software respectively adapted to run in the background of the vehicle. Moreover, the test-optimizing system comprises an ODD-compliant locations determining unit for—and/or adapted for—determining ODD-compliant locations for respective candidate software, by identifying locations out of said data of crucial locations lying within respective candidate software's ODD. The test-optimizing system further comprises a test-compliant locations determining unit for—and/or adapted for—determining at least a first test-compliant location along at least a first route out of the one or more potential vehicle routes, by identifying for at least a first candidate software, locations out of the ODD-compliant locations situated along the at least first route.

Furthermore, the disclosed subject-matter relates to a vehicle comprising a test-optimizing system as described herein.

Moreover, the disclosed subject-matter relates to a computer program product comprising a computer program containing computer program code means arranged to cause a computer or a processor to execute the steps of a test-optimizing system described herein, stored on a computer-readable medium or a carrier wave.

The disclosed subject-matter further relates to a non-volatile computer readable storage medium having stored thereon said computer program product.

Thereby, there is introduced an approach enabling targeted and/or location-specific shadow mode testing. That is, since there is retrieved one or more potential vehicle routes, there is derived one or more viable routes between two geographical locations relevant and/or applicable for an ADS-provided vehicle to potentially travel. Furthermore, that is, since there is obtained for a geographical area covering the one or more potential vehicle routes, data of crucial locations associated with past vehicle situations identified as critical and/or challenging, there is extracted and/or derived geo-tagged information relating to previously encountered and/or experienced critical and/or challenging vehicle situations applicable and/or relevant for said one or more potential vehicle routes. Moreover, that is, since there is retrieved respective ODD for one or more candidate software respectively adapted to run in the background of the vehicle, there is derived for one or more candidate ADS software up for and/or considered for potential shadow mode testing in the vehicle, respective candidate's operational conditions under which the software and/or function (s) or feature(s) thereof—and/or the ADS of the vehicle—is designed to function. Furthermore, that is, since there is determined ODD-compliant locations for respective candidate software by identifying locations out of the data of crucial locations lying within respective candidate software's ODD, there is filtered out for respective candidate software, the data of those locations of the crucial locations lying within the candidate software's operational conditions, while the data of the remaining crucial locations—i.e. those not lying within respective ODD—may be discarded and/or ignored. Moreover, that is, since there is determined at least a first test-compliant location along at least a first route out of the one or more potential vehicle routes, by identifying for at least a first candidate software—out of the one or more candidate software—locations out of the ODD-compliant locations, situated along the at least first route, there is derived for at least a first candidate software ODD-compliant locations situated along one or more of the viable routes. Accordingly, there is found regions and/or road segments deemed challenging and/or critical, and which lie within the at least first candidate software's ODD. Thus, there is pinpointed along at least a first route of the potential vehicle routes, crucial locations along which the at least first software and/or function(s) or feature(s) thereof—and/or the ADS of the vehicle—is designed to function. Consequently, with the inventive concept, it may be identified where along potential routes shadow mode testing of one or more candidate software is efficient, favourable, preferred and/or suitable. This in turn provides the opportunity of location-specific—rather than continuous—shadow mode testing of candidate software and hence of location-specific data collection along said route, which subsequently may reduce the pressure on the onboard computational resources and/or enable an increased number of candidate software and/or features thereof to be evaluated and/or run simultaneously and/or in parallel. Moreover, this further provides the opportunity of said location-specific shadow mode testing to be carried out at locations exposing the ADS—and subsequently the candidate software—to challenging and/or new traffic situations, i.e. at the test-compliant locations, which may be expedient and/or crucial for development and testing of the candidate software, and which consequently may accelerate the development loop thereof.

For that reason, an approach is provided for supporting shadow mode testing of ADS software comprised in an ADS-provided vehicle in an improved and/or alternative manner.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
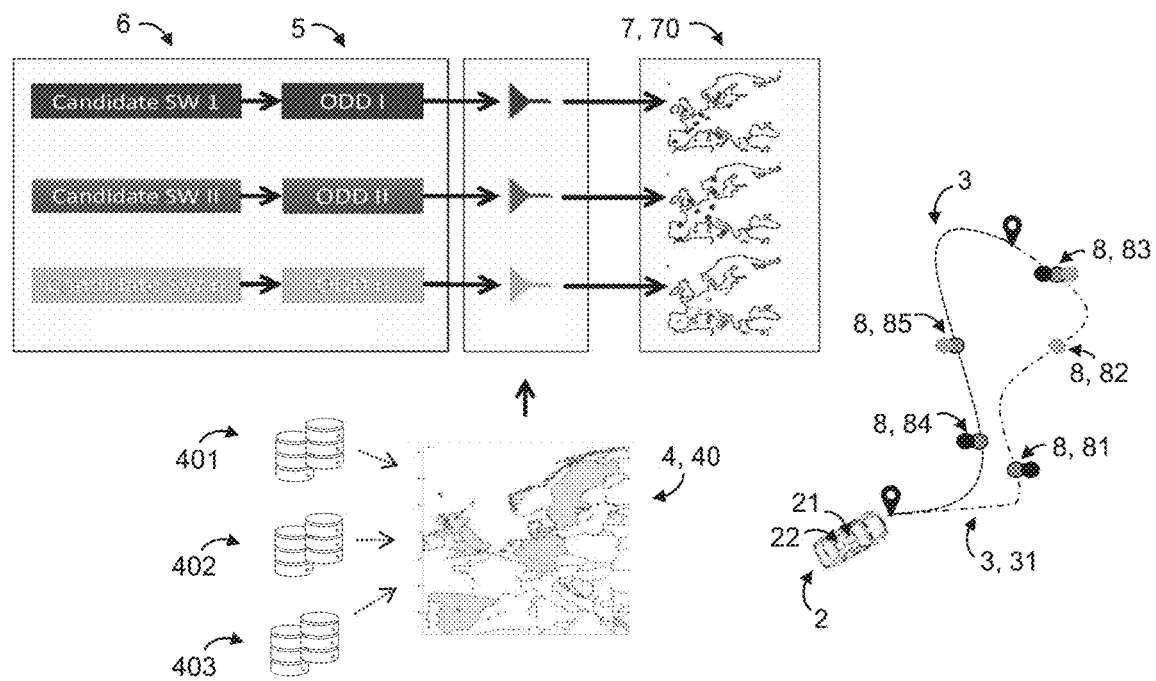
FIG. 1 illustrates a schematic view of an exemplifying test-optimizing system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting—in an improved and/or alternative manner—shadow mode testing of ADS software comprised in an ADS-provided vehicle, there will be disclosed an approach enabling targeted and/or location-specific shadow mode testing.

Figure 2:
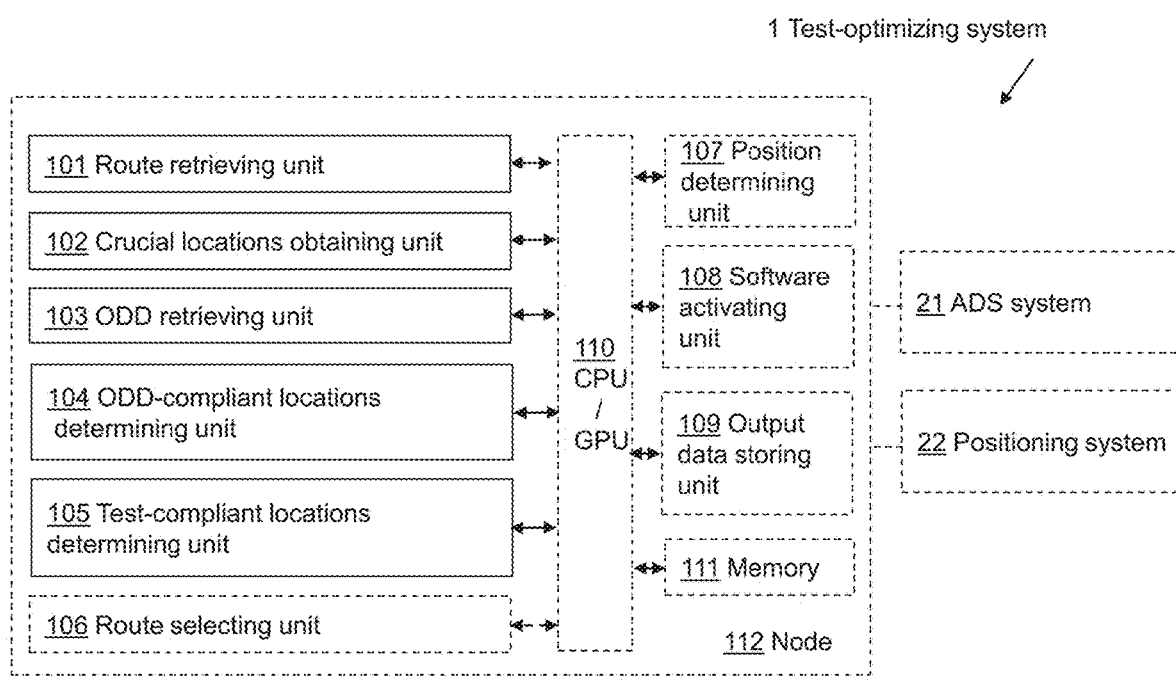
FIG. 2 is a schematic block diagram illustrating an exemplifying test-optimizing system according to embodiments of the disclosure.

Referring now to the figures, there is depicted in FIG. 1 a schematic view—and in FIG. 2 a schematic block diagram—of an exemplifying test-optimizing system 1 according to embodiments of the disclosure. The test-optimizing system 1 is adapted for supporting shadow mode testing of ADS software comprised in an ADS-provided vehicle 2. The exemplifying vehicle 2 may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle", and according to an example further to "production vehicle". Moreover, said vehicle 2 is provided with an ADS 21, which ADS 21 may be represented by any arbitrary ADAS or AD system e.g. known in the art and/or yet to be developed. Moreover, the vehicle 2 and/or ADS 21 may comprise, be provided with and/or have onboard an optional perception system (not shown) and/or similar system and/or functionality adapted to estimate surroundings of the vehicle 2, and subsequently adapted to estimate world views of the surroundings e.g. with support from a—e.g. commonly known—digital map such as a high definition, HD, map, and/or an equivalent and/or successor thereof. Such an exemplifying perception system or similar system may refer to any commonly known system and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc. The exemplifying perception system or similar system—which may be adapted to support e.g. sensor fusion, tracking, localization etc.—may thus be adapted to rely on sensory information. Such exemplifying sensory information may for instance be derived from one or more—e.g. commonly known—sensors comprised in and/or provided onboard the vehicle 2 adapted to sense and/or perceive the vehicle's 2 whereabouts and/or surroundings, for instance represented by one or a combination of one or more of surrounding detecting sensors, such as image capturing devices e.g. cameras, radar, lidar, ultrasonics etc., and/or a positioning system, odometer, inertial measurement units etc.

In general, ADS software up for and/or considered for shadow mode testing—referred to as candidate software—may be run in the background in a vehicle 2—such as a production vehicle—and consume data received from the vehicle platform. Shadow mode testing of ADS software may thus throughout the disclosure refer to running ADS-related software—such as software under development and/or new revision software—in the background in a vehicle 2 and test the performance, features and/or functionality of said software in an open-loop manner. The phrase "test-optimizing system" may refer to "test location(s) selection system" and/or "assessment system" and according to an example further to "test-optimizing system of a vehicle and/or ADS-provided vehicle". "Method performed by test-optimizing system", on the other hand, may refer to "at least partly computer-implemented method performed by a test-optimizing system", whereas "for supporting shadow mode testing" may refer to "for supporting and/or enabling location-specific, directed, targeted and/or selective shadow mode testing" and/or merely "for shadow mode testing". According to an example, "for supporting shadow mode testing" may further refer to "for location-specific, directed, targeted and/or selective activation of shadow mode testing". Moreover, "for supporting shadow mode testing of ADS software comprised in an ADS-provided vehicle" may refer to "for supporting location-specific, directed, targeted and/or selective activation of candidate software in the background of an ADS-provided vehicle" and/or "for open-loop testing of ADS software comprised in an ADS-provided vehicle", and according to an example further to "for supporting shadow mode testing of ADS software comprised in an ADS-provided vehicle while travelling". The phrase "ADS software", on the other hand, may refer to "ADS-related software", "software for an ADS", "software applicable and/or intended to be run on and/or in association with an ADS", "ADS candidate software" and/or merely "software", and according to an example further to "unreleased ADS software", "ADS software under development" and/or "new revision ADS software". Moreover, according to an example, "ADS software" may refer to "ADS software features and/or functionality". The phrase "comprised in an ADS-provided vehicle", on the other hand, may refer to "onboard an ADS-provided vehicle", "present on an ADS-provided vehicle", "adapted to run in an ADS-provided vehicle" and/or "adapted to run in association with an ADS of a vehicle".

As illustrated in an exemplifying manner in exemplifying FIG. 1, the test-optimizing system 1 is—e.g. by means of a route retrieving unit 101—adapted and/or configured for retrieving one or more potential vehicle routes 3. Thereby, there is derived one or more viable routes 3 between two geographical locations, such as between an origin and a destination, relevant and/or applicable for the vehicle 2 to potentially travel. The geographical locations—such as the origin and destination—between which the one or more potential vehicle routes 3 stretches, may be and/or have been selected in any arbitrary feasible manner, such as by an operator—e.g. occupant—of the vehicle 2 and/or by e.g. the ADS 21. Further, retrieving the one or more potential vehicle routes 3 may be accomplished in any arbitrary feasible—e.g. known—manner, such as from and/or with support from one or more of e.g. a navigation system (not shown), route planning system (not shown), the ADS 21, etc. The potential vehicle route(s) 3 may be—and/or have been—calculated, proposed and/or determined in any feasible manner, such as taking into consideration constraints such as arrival time, fuel consumption, traffic situation etc. Optionally, further constrains may be considered, as will be described in greater detail further on. Moreover, the potential vehicle route(s) 3 may originate any arbitrary distance from a current position of the vehicle's 2, for instance—although not necessarily—originating therefrom. Furthermore, although there in exemplifying FIG. 1 in an exemplifying manner is depicted two potential vehicle routes 3, the one or more vehicle routes 3 may be represented by any arbitrary feasible number of routes, e.g. ranging from a single route up to several of even tens of routes. The phrase "retrieving one or more potential vehicle routes" may refer to "deriving, obtaining and/or determining one or more potential vehicle routes", "retrieving one or more potential vehicle routes relevant and/or applicable for said vehicle", and according to an example further to "retrieving one or more potential vehicle routes between a selected first geographical location and a selected second geographical location". Furthermore, "potential vehicle routes" may refer to "viable, favourable, suggested, possible and/or feasible vehicle routes", whereas "vehicle routes" may refer to "traveling routes" and/or merely "routes". According to a further example, "retrieving one or more potential vehicle routes" may refer to "retrieving a vehicle origin and a vehicle destination".

As illustrated in an exemplifying manner in exemplifying FIG. 1, the test-optimizing system 1 is further—e.g. by means of a crucial locations obtaining unit 102—adapted and/or configured for obtaining for a geographical area covering the one or more potential vehicle routes 3, data of crucial locations 4 associated with past vehicle situations identified as critical and/or challenging. Thereby, there is extracted and/or derived geo-tagged information relating to previously encountered and/or experienced critical and/or challenging vehicle situations applicable and/or relevant for said one or more potential vehicle routes 3. The past vehicle situations may have occurred at any arbitrary previous points in time, and for instance non-related to the vehicle 2 exemplified herein. Moreover, said past vehicle situations may have been experienced by actual physical vehicles, and/or additionally or alternatively, by software simulations—for instance involving candidate software—in a simulated environment applicable for said geographical area. Furthermore, the geographical area may be represented by any geographical zone—of any arbitrary feasible size, dimensions and/or limits—comprising and/or at least to some extent comprising said potential route(s) 3. Similarly, the crucial locations 4 may be represented by any geographical locations of any arbitrary feasible sizes and/or dimensions—e.g. represented by coordinates, areas, regions and/or road sections—associated with past critical and/or challenging vehicle situations. The number of crucial locations 4 may be of any arbitrary magnitude, and for instance range from zero—should the geographical area in question not comprise any crucial locations 4—up to tens, hundreds or even thousands or more crucial locations 4. As illustrated in an exemplifying manner in exemplifying FIG. 1, the obtaining of data of crucial locations 4 may optionally comprise obtaining—and/or generating or compiling—a history-based heat map 40—or at least a first history-based heat map 40—comprising said data, whereupon said history-based heat map 40—which may be referred to as a challenge heat map—may reflect a virtual geographical map to which the crucial locations 4 are mapped, attributed with the crucial locations data.

Moreover, critical and/or challenging vehicle situations may be identified—and/or have been identified—as such, based on selectable—e.g. pre-determinable—crucial location criteria stipulating under what circumstances a location is deemed challenging and/or critical. What is considered crucial locations 4 may accordingly differ with critical and/or challenging situations of interest, which subsequently may be stipulated by said crucial location criteria and/or properties thereof. The crucial location criteria may relate to circumstances of vehicle scenarios, such as type of situation, e.g. type and/or severity of accident, near accident and/or critical event, and/or vehicle performance in relation thereto. Such crucial location criteria may then be utilized for identifying in available data and/or data sources, locations—e.g. referred to as actual locations—associated with previously experienced vehicle scenarios fulfilling such crucial location criteria, and/or locations—e.g. referred to as derived locations—exhibiting conditions, e.g. road conditions, road geometries, scenery, environmental and/or operational conditions, resembling—e.g. to a predeterminable extent—conditions of identified actual locations. The crucial location data may then in turn be represented by geo-tagged information of respective identified crucial location 4, comprising attributes and/or properties relating to respective crucial location's 4 driving-related conditions—such as road conditions, road geometries, scenery, environmental and/or operational conditions—and potentially further relating to respective crucial location's 4 therewith associated past critical and/or challenging vehicle situation(s), such as during said past situation(s) experienced and/or encountered vehicle states, surrounding objects, road conditions, environmental and/or operational conditions etc. Furthermore, the crucial location data may comprise information—e.g. contained in meta-data—indicating to what extent, to what portion(s) and/or sub-system(s) of an ADS 21 and/or ADS software, a crucial location 4 is determined and/or deemed challenging and/or of interest, such as to the whole and/or essentially the whole ADS 21 and/or ADS software, e.g. a perception system (not shown) thereof, a path planning system (not shown) thereof, etc.

Which data source(s) to use for obtaining the data of crucial locations 4 may vary, e.g. with the situation at hand and/or with the ADS software—and/or features or functionality thereof—considered for shadow mode testing. Optionally, and as illustrated in an exemplifying manner in exemplifying FIG. 1, the obtaining of data of crucial locations 4 may comprise obtaining said data—or at least a portion of said data—from—or at least partly from and/or based on—accidentology data 401—e.g. pre-stored accidentology data—indicative of past various geo-tagged critical and/or challenging vehicle situations and/or vehicle accidents. Thereby, at least a portion of the crucial locations 4 along with data may be retrieved by consulting one or more data collections and/or storages, such as e.g. commonly known accidentology databases, covering different types of geo-tagged previously experienced critical and/or challenging vehicle scenarios—such as various accidents, near accidents and/or critical events—potentially along with during such scenarios experienced vehicle states, surrounding objects, road conditions, road, geometries, scenery, environmental and/or operational conditions etc., e.g. gathered from numerous manually driven and/or ADS-controlled vehicles. Additionally or alternatively, the obtaining of data of crucial locations 4 may comprise obtaining said data—or at least a portion of said data—from—or at least partly from and/or based on—actual vehicle performance data 402 and/or simulated vehicle performance data 403—e.g. pre-stored vehicle performance data 402, 403—indicative of past various geo-tagged key performance indicators, KPIs, identified as—and/or deemed or considered—critical and/or challenging. Thereby, at least a portion of the crucial locations 4 along with data may be retrieved by consulting—from e.g. production vehicles gathered and/or from candidate software simulation reconstruction scenarios gathered—vehicle performance data covering encountered difficulties relating to ADS-controlled driving scenarios exhibiting—by fulfilling and/or exceeding criteria e.g. relating to break threat number, BTN, time-to-collision, TTC, False Positive rate, etc— vehicle KPIs deemed critical and/or challenging, along with during such scenarios experienced vehicle states, surrounding objects, road conditions, road geometries, scenery, environmental and/or operational conditions etc.

The phrase "obtaining for a geographical area" may refer to "extracting, deriving, gathering, retrieving, fetching and/or determining for a geographical area", and further to "obtaining for a geographical zone and/or region". Moreover, "geographical area covering said one or more potential vehicle routes" may refer to "geographical area at least partly overlapping and/or at least to some extent comprising said one or more potential vehicle routes". According to an example, "geographical area covering said one or more potential vehicle routes" may further refer to "geographical area covering said vehicle origin and said vehicle destination". The phrase "data of crucial locations", on the other hand, may refer to "data pertinent and/or relating to crucial locations" and/or "information of crucial locations", and according to an example further to "geo-tagged data of crucial locations" and/or "driving-related data of crucial locations". Moreover, "crucial locations" may refer to "crucial locations represented by geographical coordinates, areas, regions and/or road sections", "critical and/or challenging locations" and/or "selected locations", and according to an example further to "candidate locations" and/or "potential test locations". The phrase "crucial locations associated with past vehicle situations", on the other hand, may refer to "crucial locations associated with past vehicle scenarios", "crucial locations associated with former, previous, historical, and/or previously experienced and/or encountered vehicle situations", "crucial locations associated with one or more past vehicle situations", "crucial locations associated with past actual and/or simulated vehicle situations", "crucial locations associated with past vehicle driving situations" and/or "crucial locations related to past vehicle situations", and according to an example further to "crucial locations of and/or pertinent past vehicle situations". Furthermore, "vehicle situations identified as critical and/or challenging" may refer to "vehicle scenarios identified as critical and/or challenging". "vehicle situations deemed, considered, defined and/or determined critical and/or challenging" and/or "vehicle situations identified as crucial". According to an example, "vehicle situations identified as critical and/or challenging" may further refer to "vehicle situations identified as critical and/or challenging in view of shadow mode testing", "vehicle situations identified as critical and/or challenging in view of shadow mode testing of selected candidate software", "vehicle situations identified as critical and/or challenging by fulfilling predeterminable crucial location criteria" and/or "vehicle situations identified as critical and/or challenging by fulfilling predeterminable crucial location criteria stipulating under what circumstances a location is deemed challenging and/or critical".

As illustrated in an exemplifying manner in exemplifying FIG. 1, the test-optimizing system 1 is further—e.g. by means of an ODD retrieving unit 103—adapted and/or configured for retrieving respective operational design domain, ODD 5, for one or more candidate software 6 respectively adapted to run in the background of the vehicle 2. Thereby, there is derived for one or more candidate ADS software 6 up for and/or considered for potential shadow mode testing in the vehicle 2, respective candidate's 6 operational conditions under which the software and/or function(s) or feature(s) thereof—and/or the ADS 21 of the vehicle 2—is designed to function. The one or more candidate software 6 adapted to run in the background of the vehicle 2, may be represented by any arbitrary feasible number of pieces of software, such as ranging from a single candidate software up to five, ten, or even tens of pieces of software. Moreover, each of the one or more candidate software 6—also referred to as candidate SW—may be represented by any arbitrary feasible piece of software up for potential shadow mode testing, associated with and/or handling ADS-related functionality, functions and/or features. In exemplifying FIG. 1, the one or more candidate software 6 is in an exemplifying manner represented by Candidate SW I, Candidate SW II, Candidate SW n. Respective ODD 5, on the other hand, may be represented by any arbitrary feasible respective operational conditions, as known in the art, such as conditions relating to e.g. road, surroundings, speed, etc. In exemplifying FIG. 1, respective ODD 5 for the one or more candidate software 6 is in an exemplifying manner represented by ODD I, ODD II, ODD n for Candidate SW I, Candidate SW II, Candidate SW n, respectively. The phrase "retrieving respective ODD" may refer to "deriving, fetching, and/or obtaining respective ODD", "retrieving a respective at least first ODD" and/or "retrieving respective operational conditions under which the ADS of the vehicle is designed to work", whereas "for one or more candidate software" may refer to "for one or more shadow mode software", "for one or more candidate ADS software", "for at least a first candidate software" and/or "for one or more pieces of ADS-related software up for and/or considered for shadow mode testing". According to an example, "for one or more candidate software" may further refer to "for one or more candidate software features, functionality and/or functions". Moreover, "adapted to run in the background of said vehicle" may refer to "configured to run in the background of said vehicle" and/or "adapted for shadow mode testing and/or open-loop testing in said vehicle and/or in the background of said vehicle", and according to an example further to "adapted to run in the background of the ADS of said vehicle".

As illustrated in an exemplifying manner in exemplifying FIG. 1, the test-optimizing system 1 is further—e.g. by means of an ODD-compliant locations determining unit 104—adapted and/or configured for determining ODD-compliant locations 7 for respective candidate software 6, by identifying locations 7 out of the data of crucial locations 4, lying within respective candidate software's 6 ODD 5. Thereby, there is filtered out for respective candidate software 6, the data of those locations 7 of the crucial locations 4 lying within the candidate software's 6 operational conditions 5, while the data of the remaining crucial locations 4—i.e. those not lying within respective ODD 5—may be discarded and/or ignored. The number of ODD-compliant locations 7 for respective candidate software 6 may be of any arbitrary magnitude, and for instance range from zero—should none of the crucial locations 4 lie within the ODD 5 of the candidate software 6—up to tens, hundreds or even thousands or more ODD-compliant locations 7. Moreover, the ODD-compliant locations 7 for respective candidate software 6 may be determined by assessing, analyzing, comparing and/or overlaying the obtained data of crucial locations 4 associated with past vehicle situations identified as critical and/or challenging, with and/or in view of respective software's 6 ODD 5, and pinpointing and/or deriving those locations 7 and data pertinent therewith lying within respective software's 6 ODD 5. Optionally, the determining of ODD-compliant locations 7 may comprise identifying said ODD-compliant locations 7 from respective candidate-specific heat maps 70 generated by mapping—and/or overlaying—respective candidate software's 6 ODD 5 to the— optional—history-based heat map 40, whereupon said candidate-specific heat maps 70—which may be referred to as candidate-specific and/or candidate-dependent challenge heat maps 70—may reflect respective virtual geographical maps to which—for respective candidate software 6—the respective ODD-compliant locations 7—along with their associated data—are mapped, e.g. filtered based on the exemplifying meta-data discussed above. In exemplifying FIG. 1, there is illustrated in an exemplifying manner ODD-compliant locations 7—and optional candidate-specific heat maps 70—for candidate SW I, candidate SW II and candidate SW n, respectively. The phrase "determining ODD-compliant locations" may refer to "obtaining, retrieving, extracting, fetching, deriving, filtering out and/or selecting ODD-compliant locations", and further to "determining ODD-compliant geographical locations, areas, regions and/or zones". Moreover, "by identifying locations out of said data of crucial locations" may refer to "by filtering out, extracting, pinpointing and/or selecting locations out of said data of crucial locations", "by identifying locations from said data of crucial locations" and/or "by identifying for respective candidate software, locations out of said data of crucial locations", whereas "lying within respective candidate software's ODD" may refer to "compatible with respective candidate software's ODD".

As illustrated in an exemplifying manner in exemplifying FIG. 1, the test-optimizing system 1 is further—e.g. by means of a test-compliant locations determining unit 105—adapted and/or configured for determining at least a first test-compliant location 8 along at least a first route 3 out of the one or more potential vehicle routes 3, by identifying for at least a first candidate software 6—out of said one or more candidate software 6—locations 8 out of said ODD-compliant locations 7, situated along said at least first route 3. Thereby, there is derived for at least a first candidate software 6, ODD-compliant locations 8 situated along one or more of the viable routes 3. Accordingly, there is found regions and/or road segments 8 deemed challenging and/or critical, and which lie within the at least first candidate software's 6 ODD 5. Thus, there is pinpointed along at least a first route 3 of the potential vehicle routes 3, crucial locations 8 along which the at least first software 6 and/or function(s) or feature(s) thereof—and/or the ADS 21 of the vehicle 2—is designed to function. Consequently, with the inventive concept, it may be identified where along potential routes 3 shadow mode testing of one or more candidate software 6 is efficient, favourable, preferred and/or suitable. This in turn provides the opportunity of location-specific—rather than continuous—shadow mode testing of candidate software 6 and hence of location-specific data collection along said route 3, which subsequently may reduce the pressure on the onboard computational resources and/or enable an increased number of candidate software 6 and/or features thereof to be evaluated and/or run simultaneously and/or in parallel. Moreover, this further provides the opportunity of said location-specific shadow mode testing to be carried out at locations 8 exposing the ADS 21—and subsequently the candidate software 6—to challenging and/or new traffic situations, i.e. at the test-compliant locations 8, which may be expedient and/or crucial for development and testing of the candidate software 6, and which consequently may accelerate the development loop thereof. In exemplifying FIG. 1, there is illustrated in an exemplifying manner—along the right-hand side potential vehicle route 3—three test-compliant locations 8 lying within at least a first candidate software's 6 ODD 5, namely a first test-compliant location 81 lying within ODD I of Candidate SW I and ODD II of Candidate SW II respectively, a second test-compliant location 82 lying within ODD n of Candidate SW n, and a third test-compliant location 83 lying within ODD I of Candidate SW I, ODD II of Candidate SW II and ODD n of Candidate SW n respectively. Similarly, there is illustrated in an exemplifying manner—along the left-hand side potential vehicle route 3—two further test-compliant locations 8 lying within at least a first candidate software's 6 ODD 5, namely a fourth test-compliant location 84 lying within ODD I of Candidate SW I and ODD II of Candidate SW II respectively, and a fifth test-compliant location 85 lying within ODD II of Candidate SW II and ODD n of Candidate SW n respectively.

The number of test-compliant locations 8 along at least a first route 3 out of the one or more potential vehicle routes 3, may be of any arbitrary magnitude, and for instance range from zero—should none of the ODD-compliant locations 7 be located along said at least first route 3—up to tens, hundreds or even thousands or more test-compliant locations 8. Moreover, the at least first test-compliant location 8 may be determined by assessing, analyzing, comparing and/or overlaying the ODD-compliant locations 7 with and/or in view of at least a first route 3 of the one or more potential vehicle routes 3, and pinpointing and/or deriving the locations 8 of the ODD-compliant locations 7 located along said at least first route 3. According to an example, the determining of test-compliant locations 8 may comprise identifying said test-compliant locations 8 by mapping—and/or overlaying—the at least first route 3 to the—optional—candidate-specific heat maps 70. The phrase "determining at least a first test-compliant location" may refer to "obtaining, retrieving, extracting, fetching, deriving, filtering out and/or selecting at least a first test-compliant location", and further to "determining at least a first test-compliant geographical location, area, region and/or zone", "determining at least a first route-compliant location" and/or "determining at least a first shadow mode test-compliant, test-favorable and/or test-relevant location". Moreover, "along at least a first route" may refer to "situated, located and/or positioned along at least a first route", whereas "by identifying for at least a first candidate software" may refer to "by extracting, pinpointing, filtering out and/or selecting for at least a first candidate software" and/or "by identifying for at least a first candidate software out of said one or more candidate software". The phrase "locations situated along said at least first route", on the other hand, may refer to "locations positioned and/or located along said at least first route". Furthermore, "determining at least a first test-compliant location along at least a first route out of said one or more potential vehicle routes" may according to an example refer to "determining at least a first test-compliant location along at least a first route between said vehicle origin and said vehicle destination"

Optionally, and as illustrated in an exemplifying manner in exemplifying FIG. 1, the test-optimizing system 1 may further—e.g. by means of an optional route selecting unit 106—be adapted and/or configured for selecting a route 31 out of the at least first route 3, in consideration of properties of respective at least first route's 3 test-compliant location(s) 8. Thereby, there may be chosen—for instance based on number of, attributes of and/or characteristics of the test-compliant location(s) 8, and/or based on which of and/or number of the candidate software's 6 ODD 5 the test-compliant location(s) 8 lie within—a route 31 which to great and/or to greatest extent exposes the ADS 21—and subsequently the at least first candidate software 6—to one or more test-compliant locations 8 in a manner deemed favourable, relevant and/or preferred. Consequently, in favouring routes 3 over one another based on properties of the test-compliant locations 8 situated along respective at least first route 3—with acceptably low risk for the ADS 21 itself—a route 31 may be selected which is likely to—and/or most likely to—expose the at least first candidate software 6 to relevant scenarios and/or situations, i.e. test-compliant locations 8, which potentially may accelerate development of said software and/or features thereof. In exemplifying FIG. 1, the right-hand side route 3 is exemplified as the selected route 31—favoured over the left-hand side route 3—for instance based on a greater number of test-compliant locations 8—namely the exemplifying first, second and third test-compliant locations 81, 82, 83—being situated along said route 31, and/or for instance based on one or more of the test-compliant locations 8 of the selected route 31 lying within a greater number of candidate software ODDs 5, namely ODD I of Candidate SW I and ODD II of Candidate SW II respectively for the first test-compliant location 81, ODD n of Candidate SW n for the second test-compliant location 82, and ODD I of Candidate SW I, ODD II of Candidate SW II and ODD n of Candidate SW n respectively for the third test-compliant location 83. The phrase "selecting a route" may refer to "favoring a route", "selecting a route deemed and/or considered favourable, rewarding, preferred and/or relevant for said vehicle to travel, "determining a preferred route" and/or "selecting at least one route", whereas "in consideration of properties" may refer to "based on and/or in view of properties". Moreover, "in consideration of properties of respective at least first route's test-compliant locations" may refer to "in consideration of properties of test-compliant locations situated, located and/or positioned along respective at least first route", and according to an example further to "in consideration of properties comprising number of, attributes of and/or characteristics of respective at least first route's test-compliant locations, and/or for said respective at least first route, which—and/or how many—candidate software ODDs one or more of said test-compliant locations lie within". Furthermore, according to an example, "selecting a route out of said at least first route in consideration of properties of respective at least first route's test-compliant locations" may refer to "selecting a route out of said at least first route in consideration of properties of respective at least first route's test-compliant locations, the selected route's test-compliant locations properties fulfilling predeterminable route selection criteria".

The following actions optionally performed by the test-optimizing system 1, may be carried out as the vehicle 2 is travelling. Thus, optionally, the test-optimizing system 1 may furthermore—e.g. by means of a position determining unit 107—be adapted and/or configured for determining with support from a positioning system 22, a geographical position of the vehicle 2 along a route 3 selected out of the at least first route 3. The test-optimizing system 1 may then further—e.g. by means of a software activating unit 108—be adapted and/or configured for activating in the background of the vehicle 2 one or more candidate software 6 out of the at least first candidate software 6, when said vehicle position is within a predeterminable distance of the at least first test-compliant location 8. Thereby, by the relevant candidate software 6 being active only when the vehicle 2 is positioned along—and/or in vicinity of—the test-compliant location(s) 8 along the route 3 selected, location-based, targeted, directed and/or selective shadow mode testing of one or more candidate software 6 may be effected and/or realized, subsequently supporting avoidance of continuously ongoing testing and/or evaluation of said candidate software 6. In exemplifying FIG. 1, should the route 3 selected be represented by the right-hand side route 3, i.e. the optional selected route 31, then Candidate SW I and Candidate SW II may respectively be active when the vehicle 2 is positioned at and/or in vicinity of the first test-compliant location 81, Candidate SW n may be active when the vehicle 2 is positioned at and/or in vicinity of the second test-compliant location 82, and Candidate SW I, Candidate SW II and Candidate SW n may respectively be activated when the vehicle 2 is positioned at and/or in vicinity of the third test-compliant location 83. Should on the other hand the route 3 selected be represented by the left-hand side route 3, then Candidate SW I and Candidate SW II may respectively be active when the vehicle 2 is positioned at and/or in vicinity of the fourth test-compliant location 84, and Candidate SW II and Candidate SW n respectively be active when the vehicle 2 is positioned at and/or in vicinity of the fifth test-compliant location 85. Potentially, it may be necessary and/or of interest—e.g. due to limitations on the available resources for shadow mode testing, which in turn may implicate that it may not be possible and/or may be deemed not feasible or suitable to run plural and/or all relevant candidate software 6 in parallel and/or simultaneously—to prioritize which among the relevant candidate software 6 at a specific test-compliant location 8—such as for instance in an exemplifying manner at the third test-compliant location 83—to activate. Such prioritization may be based on any predeterminable criteria which may filter out one or more of the candidate software 6, and for instance be based on one or a combination of respective candidate software's 6 planned release date, maturity level of test in shadow mode up to date, safety level requirement, etc.

The positioning system 22 may be represented by any arbitrary—e.g. known—system(s), sensor(s) and/or algorithm(s) supporting geographical positioning of the vehicle 2, e.g. involving GNSS such as GPS, and/or involving a digital map such as high definition, HD, map. Moreover, the route 3 selected may be selected—and/or have been selected—in any feasible manner, for instance by an operator, a navigation system, the ADS 21 etc., for instance taking into consideration constraints such as arrival time, fuel consumption, traffic situation etc. Furthermore, the route 3 selected may optionally refer to the selected route 31 discussed above. The predeterminable distance and/or time range from the respective test-compliant location 8 within which the relevant candidate software 6 should be active, on the other hand, may be of any feasible magnitude, for instance ranging from a few meters up to hundreds of even thousands of meters, and/or ranging from less than a second up to several seconds or even tens of seconds. The phrase "determining [. . . ] a geographical position" may refer to "determining [. . . ] a current and/or essentially current geographical position" and/or "estimating [. . . ] a geographical position", whereas "with support from a positioning system" may refer to "with support from a positioning system comprised in and/or onboard said vehicle". Moreover, "determining [. . . ] a geographical position along a route selected out of said at least first route" may refer to merely "determining [. . . ] a geographical position". The phrase "activating in the background of said vehicle said at least first candidate software", on the other hand, may refer to "communicating raw data from at least a first sensor associated with the ADS of said vehicle, to said at least first candidate software". Furthermore, "when said vehicle is within a predeterminable distance of and/or time range" may refer to "provided that said vehicle is within a predeterminable distance of and/or time range".

Optionally, the activating of one or more candidate software 6 may comprise activating said one or more candidate software 6, when the vehicle position is within a predeterminable distance of and/or time range from the at least first test-compliant location 8 and dynamic ODD conditions for said one or more candidate software 6 are fulfilled. Thereby, by the relevant candidate software 6 being active only when the vehicle 2 is positioned along—and/or in vicinity of—the test-compliant location(s) 8 along the route 3 and—when in addition thereto—there at said test-compliant location(s) 8 is compliance with dynamic ODD conditions of said relevant candidate software's 6 ODD 5—such as e.g. vehicle speed, presence of a lead vehicle, presence of a specific object type etc.—activation of said candidate software 6 at test-compliant locations 8 may be avoided should said dynamic ODD conditions not be met. Accordingly, even though the vehicle 2 may be approaching, entering and/or be positioned at and/or along a test-compliant location 8, the possibility of dynamic ODD conditions not being met may apply and/or arise, in which case it may be unnecessary and/or irrelevant for the relevant candidate software 6 to be activated and/or be active. The phrase "and dynamic ODD conditions for said one or more candidate software are fulfilled" may refer to "and when and/or provided that dynamic ODD conditions for said one or more candidate software are fulfilled", "and at least a first ODD condition for said one or more candidate software are fulfilled", "and respective dynamic ODD conditions for said one or more candidate software are fulfilled" and/or "and dynamic conditions comply with said one or more candidate software's ODD".

Further optionally, the test-optimizing system 1 may further—e.g. by means of a data output storing unit 109—be adapted and/or configured for storing output data generated by the one or more candidate software 6. Thereby, the output data generated by the shadow mode testing of relevant candidate software 6, may be gathered for subsequent post-processing and/or evaluation, for instance as known in the art. The output data may be of any arbitrary feasible quantity and/or format, and may further be stored in any feasible manner, such as onboard said vehicle 2, e.g. in association to the ADS 21. Moreover, the phrase "storing output data" may refer to "storing test data", "storing digitally and/or electronically output data" and/or "logging, collecting and/or gathering output data".

As further shown in FIG. 2, the test-optimizing system 1 comprises a route retrieving unit 101, a crucial locations obtaining unit 102, an ODD retrieving unit 103, an ODD-compliant locations determining unit 104, a test-compliant locations determining unit 105, an optional route selecting unit 106, an optional position determining unit 107, an optional software activating unit 108 and an optional output data storing unit 109, all of which already have been described in greater detail above. Furthermore, the embodiments herein for supporting shadow mode testing of ADS software comprised in an ADS-provided vehicle 2, may be implemented through one or more processors, such as a processor 110, for instance represented by at least a first Central Processing Unit, CPU, and/or at least a first Graphics Processing Unit, GPU, together with computer program code for performing the functions and actions of the embodiments herein. Said program code may also be provided as a computer program product, for instance in the form of a data carrier carrying computer program code for performing the embodiments herein when being loaded into the test-optimizing system 1. One such carrier may be in the form of a CD/DVD ROM disc and/or a hard drive, it is however feasible with other data carriers. The computer program code may furthermore be provided as pure program code on a server and downloaded to the test-optimizing system 1. The test-optimizing system 1 may further comprise a memory 111 comprising one or more memory units. The memory 111 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 111 may be arranged to be used to store e.g. information, and further to store data, configurations, scheduling, and applications, to perform the methods herein when being executed in the test-optimizing system 1. For instance, the computer program code may be implemented in the firmware, stored in FLASH memory 111, of an embedded processor 110, and/or downloaded wirelessly e.g. from an off-board server. Furthermore, the route retrieving unit 101, the crucial locations obtaining unit 102, the ODD retrieving unit 103, the ODD-compliant locations determining unit 104, the test-compliant locations determining unit 105, the optional route selecting unit 106, the optional position determining unit 107, the optional software activating unit 108, the optional output data storing unit 109, the optional processor 110 and/or the optional memory 111, may at least partly be comprised in one or more nodes 112 e.g. ECUs of the vehicle 2, e.g. in and/or in association with the ADS 21. Those skilled in the art will also appreciate that said units 101, 102, 103, 104, 105, 106, 107, 108, 109 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 111, that when executed by the one or more processors such as the processor 110 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 3:
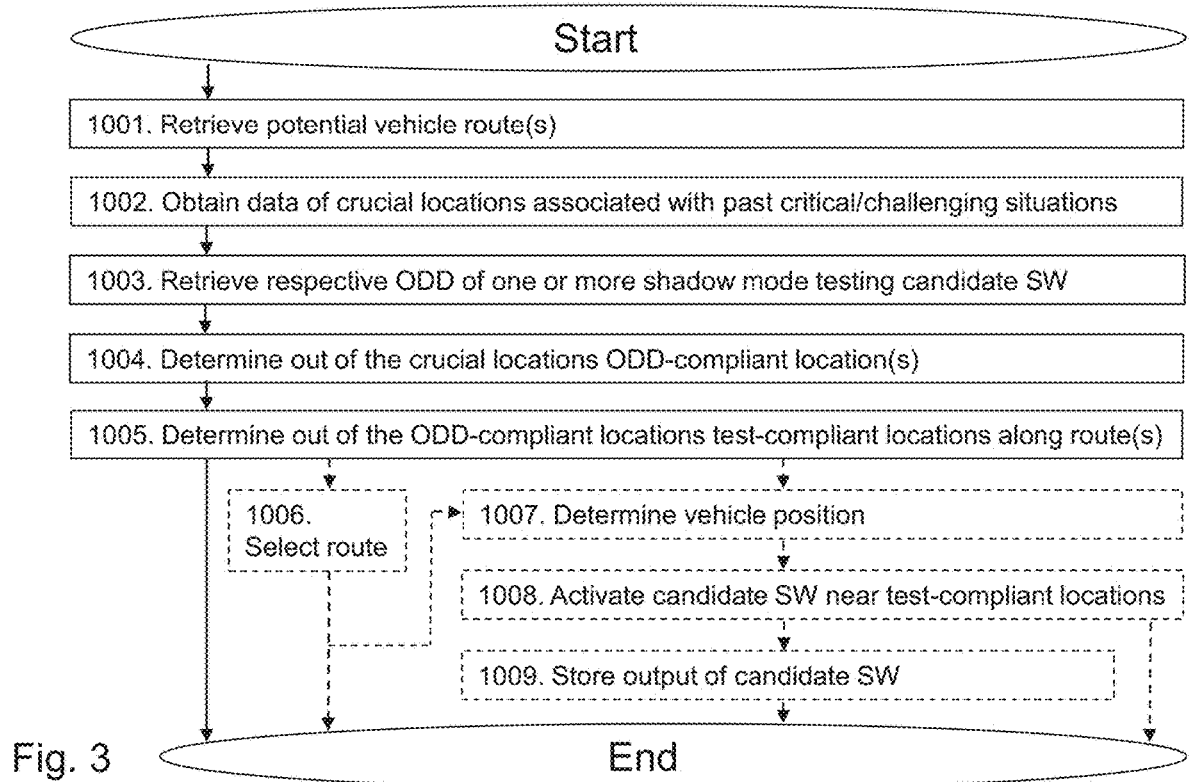
FIG. 3 is a flowchart depicting an exemplifying method performed by a test-optimizing system according to embodiments of the disclosure.

FIG. 3 is a flowchart depicting an exemplifying method performed by a test-optimizing system 1 according to embodiments of the disclosure. Said method is for supporting shadow mode testing of ADS software comprised in an ADS-provided vehicle 2. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, Action 1001 and Action 1002 may be performed essentially simultaneously and/or in alternate order.

Action 1001

In Action 1001, the test-optimizing system 1 retrieves—e.g. with support from the route retrieving unit 101—one or more potential vehicle routes 3.

Action 1002

In Action 1002, the test-optimizing system 1 obtains—e.g. with support from the crucial locations obtaining unit 102—for a geographical area covering the one or more potential vehicle routes 3, data of crucial locations 4 associated with past vehicle situations identified as critical and/or challenging.

Optionally, Action 1002 of obtaining data of crucial locations 4 may comprise—and/or the crucial locations obtaining unit 102 may be adapted and/or configured for—obtaining said data from
- accidentology data indicative of past various geo-tagged critical and/or challenging vehicle situations and/or vehicle accidents; and/or
- actual and/or simulated vehicle performance data indicative of past various geo-tagged key performance indicators, KPIs, identified as critical and/or challenging.

Further optionally, Action 1002 of obtaining data of crucial locations 4 may comprise—and/or the crucial locations obtaining unit 102 may be adapted and/or configured for—obtaining—and/or generating or compiling—a history-based heat map 40 comprising said data.

Action 1003

In Action 1003, the test-optimizing system 1 retrieves—e.g. with support from the ODD retrieving unit 103—respective ODD 5 for one or more candidate software 6 respectively adapted to run in the background of the vehicle 2.

Action 1004

In Action 1004, the test-optimizing system 1 determines—e.g. with support from the ODD-compliant locations determining unit 104—ODD-compliant locations 7 for respective candidate software 6, by identifying locations 7 out of the data of crucial locations 4 lying within respective candidate software's 6 ODD 5.

Optionally, Action 1004 of determining ODD-compliant locations 7 may comprise—and/or the ODD-compliant locations determining unit 104 may be adapted and/or configured for—identifying said ODD-compliant locations 7 from respective candidate-specific heat maps 70 generated by mapping respective candidate software's ODD to the optional history-based heat map 40.

Action 1005

In Action 1005, the test-optimizing system 1 determines—e.g. with support from the test-compliant locations determining unit 105—at least a first test-compliant location 8 along at least a first route 3 out of the one or more potential vehicle routes 3, by identifying for at least a first candidate software 6, locations out of the ODD-compliant locations 7, situated along the at least first route 3.

Action 1006

In optional Action 1006, the test-optimizing system 1 may select—e.g. with support from the optional route selecting unit 106—a route 31 out of the at least first route 3 in consideration of properties of respective at least first route's 3 test-compliant locations 8.

Action 1007

In optional Action 1007, the test-optimizing system 1 may determine—e.g. with support from the optional position determining unit 107—with support from a positioning system 22, a geographical position of the vehicle 2 along a route 3 selected out of the at least first route 3.

Action 1008

In optional Action 1008, which may follow upon optional Action 1007, the test-optimizing system 1 may activate—e.g. with support from the optional software activating unit 108—in the background of the vehicle 2, one or more candidate software 6 out of the at least first candidate software 6, when the vehicle position is within a predeterminable distance of and/or time range from the at least first test-compliant location 8.

Optionally, optional Action 1008 of activating one or more candidate software 6 may comprise—and/or the optional software activating unit 108 may be adapted and/or configured for—activating said one or more candidate software 6, when the vehicle position is within a predeterminable distance of and/or time range from the at least first test-compliant location 8 and dynamic ODD conditions for said one or more candidate software 6 are fulfilled.

Action 1009

In optional Action 1009, which may follow upon optional Action 1008, the test-optimizing system 1 may store—e.g. with support from the optional output data storing unit 109—output data generated by the one or more candidate software 6.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a test-optimizing system for supporting shadow mode testing of automated driving system, ADS, software comprised in an ADS provided vehicle, the method comprising:
- retrieving one or more potential vehicle routes;
- obtaining for a geographical area covering the one or more potential vehicle routes, data of crucial locations associated with past vehicle situations identified as at least one of critical and challenging;
- retrieving respective operational design domain, ODD, for one or more candidate software respectively adapted to run in a background of the vehicle;
- determining ODD-compliant locations for respective candidate software, by identifying locations out of the data of crucial locations lying within the ODD of the respective candidate software;
- determining at least a first test-compliant location along at least a first route out of the one or more potential vehicle routes, by identifying for at least a first candidate software, locations out of the ODD-compliant locations, situated along the at least first route;
- determining with support from a positioning system, a geographical position of the vehicle along a route selected out of the at least first route; and activating in the background of the vehicle the one or more candidate software out of the at least first candidate software, when the vehicle position is within at least one of a predeterminable distance of and a time range from the at least first test-compliant location.

2. The method according to claim 1, further comprising:
selecting a route out of the at least first route in consideration of properties of respective test-compliant locations of the at least first route.

3. The method according to claim 2, wherein the obtained data of crucial locations, comprises obtaining the data from at least one of:
accidentology data indicative of at least one of:
past various geo-tagged critical;
challenging vehicle situations; and
vehicle accidents; and
at least one of actual and simulated vehicle performance data indicative of past various geo-tagged key performance indicators, KPIs, identified as the at least one of critical and challenging.

4. The method according to claim 1, further comprising:
determining with support from a positioning system, a geographical position of the vehicle along a route selected out of the at least first route; and
activating in the background of the vehicle the one or more candidate software out of the at least first candidate software, when the vehicle position is within at least one of a predeterminable distance of and a time range from the at least first test-compliant location.

5. The method according to claim 4, wherein the activating comprises activating the one or more candidate software, when the vehicle position is within the at least one of a predeterminable distance of and a time range from the at least first test-compliant location and dynamic ODD conditions for the one or more candidate software are fulfilled.

6. The method according to claim 5, further comprising:
storing output data generated by the one or more candidate software.

7. The method according to claim 1, wherein the obtained data of crucial locations, comprises obtaining the data from at least one of:
accidentology data indicative of at least one of:
past various geo-tagged critical;
challenging vehicle situations; and
vehicle accidents; and
at least one of actual and simulated vehicle performance data indicative of past various geo-tagged key performance indicators, KPIs, identified as the at least one of critical and challenging.

8. A test-optimizing system for supporting shadow mode testing of automated driving system, ADS, software comprised in an ADS-provided vehicle, the test-optimizing system comprising:
at least one processor configured to:
retrieve one or more potential vehicle routes;
obtain, for a geographical area covering the one or more potential vehicle routes, data of crucial locations associated with past vehicle situations identified as at least one of critical and challenging;
retrieve respective operational design domain, ODD, for one or more candidate software respectively adapted to run in a background of the vehicle;
determine ODD-compliant locations for respective candidate software, by identifying locations out of the data of crucial locations lying within the ODD of the respective candidate software;
determine at least a first test-compliant location along at least a first route out of the one or more potential vehicle routes, by identifying for at least a first candidate software, locations out of the ODD-compliant locations, situated along the at least first route;
determine, with support from a positioning system, a geographical position of the vehicle along a route selected out of the at least first route; and
activate, in the background of the vehicle, the one or more candidate software out of the at least first candidate software, when the vehicle position is within at least one of a predeterminable distance of and a time range from the at least first test-compliant location.

9. The test-optimizing system according to claim 8, wherein the at least one processor is further configured to:
select a route out of the at least first route in consideration of properties of respective test-compliant locations of the at least first route.

10. The test-optimizing system according to claim 9, wherein the at least one processor is further configured to obtain the data from:
accidentology data indicative of at least one of:
past various geo-tagged critical;
challenging vehicle situations; and
vehicle accidents; and
at least one of actual and simulated vehicle performance data indicative of past various geo-tagged key performance indicators, KPIs, identified as the at least one of critical and challenging.

11. The test-optimizing system according to claim 8, wherein the at least one processor is further configured to:
determine, with support from a positioning system, a geographical position of the vehicle along a route selected out of the at least first route; and
activate, in the background of the vehicle, the one or more candidate software out of the at least first candidate software, when the vehicle position is within at least one of a predeterminable distance of and a time range from the at least first test-compliant location.

12. The test-optimizing system according to claim 11, wherein the at least one processor is further configured to activate the one or more candidate software, when the vehicle position is within the at least one of a predeterminable distance of and a time range from the at least first test-compliant location and dynamic ODD conditions for the one or more candidate software are fulfilled.

13. The test-optimizing system according to claim 12, wherein the at least one processor is further configured to:
store output data generated by the one or more candidate software.

14. The test-optimizing system according to claim 8, wherein the at least one processor is further configured to obtain the data from:
accidentology data indicative of at least one of:
past various geo-tagged critical;
challenging vehicle situations; and
vehicle accidents; and
at least one of actual and simulated vehicle performance data indicative of past various geo-tagged key performance indicators, KPIs, identified as the at least one of critical and challenging.

15. The test-optimizing system according to claim 8, wherein the test-optimizing system is comprised in a vehicle.

16. A non-transitory computer storage medium storing a computer program containing computer program code configured to cause one of a computer and a processor to perform a method, the method comprising:
   retrieving one or more potential vehicle routes;
   obtaining for a geographical area covering the one or more potential vehicle routes, data of crucial locations associated with past vehicle situations identified as at least one of critical and challenging;
   retrieving respective operational design domain, ODD, for one or more candidate software respectively adapted to run in a background of the vehicle;
   determining ODD-compliant locations for respective candidate software, by identifying locations out of the data of crucial locations lying within the ODD of the respective candidate software;
   determining at least a first test-compliant location along at least a first route out of the one or more potential vehicle routes, by identifying for at least a first candidate software, locations out of the ODD-compliant locations, situated along the at least first route;
   determining with support from a positioning system, a geographical position of the vehicle along a route selected out of the at least first route; and
   activating in the background of the vehicle the one or more candidate software out of the at least first candidate software, when the vehicle position is within at least one of a predeterminable distance of and a time range from the at least first test-compliant location.

* * * * *